United States Patent
Chang et al.

(10) Patent No.: US 9,948,133 B2
(45) Date of Patent: Apr. 17, 2018

(54) WIRELESS CHARGING METHOD, WIRELESS CHARGING DEVICE, AND WIRELESS CHARGING SYSTEM

(71) Applicant: Wistron Corporation, New Taipei (TW)

(72) Inventors: Yao-Tsung Chang, New Taipei (TW); Te-Lung Wu, New Taipei (TW); Chu-Chia Tsai, New Taipei (TW)

(73) Assignee: Wistron Corporation, New Taipei (TW)

( * ) Notice: Subject to any disclaimer, the term of this patent is extended or adjusted under 35 U.S.C. 154(b) by 144 days.

(21) Appl. No.: 15/068,666

(22) Filed: Mar. 14, 2016

(65) Prior Publication Data

US 2017/0063139 A1    Mar. 2, 2017

(30) Foreign Application Priority Data

Aug. 31, 2015   (TW) .............................. 104128618 A (51) Int. Cl.
  *H02J 7/00*     (2006.01)
  *H02J 7/02*     (2016.01)
  *H02J 7/04*     (2006.01)

(52) U.S. Cl.
  CPC .............. *H02J 7/025* (2013.01); *H02J 7/045* (2013.01); *H02J 2007/0096* (2013.01)

(58) Field of Classification Search
  CPC ..... H02J 7/025; H02J 7/045; H02J 2007/0096
  USPC ....... 320/106, 108, 109, 104, 135, 160, 124, 320/125; 307/150
  See application file for complete search history.

(56) References Cited

U.S. PATENT DOCUMENTS

| | | | |
|---|---|---|---|
| 8,069,100 B2 | 11/2011 | Taylor | |
| 2011/0095652 A1* | 4/2011 | Winger | A45C 15/00 310/339 |
| 2011/0112610 A1* | 5/2011 | Rahman | A61N 1/3718 607/60 |
| 2011/0169489 A1* | 7/2011 | Leussler | G01R 33/288 324/307 |
| 2011/0181239 A1* | 7/2011 | Kadoyama | H02J 7/025 320/108 |
| 2011/0221391 A1* | 9/2011 | Won | H01M 10/44 320/108 |
| 2012/0299557 A1* | 11/2012 | Kwon | H02J 5/005 320/166 |

(Continued)

FOREIGN PATENT DOCUMENTS

TW      201401707 A      1/2014

OTHER PUBLICATIONS

Jan et al., Korean Patent Document No. KR-1153179-B1, published Jun. 18, 2012, abstract, 2 pages.*

(Continued)

*Primary Examiner* — Phallaka Kik
(74) *Attorney, Agent, or Firm* — Winston Hsu (57) ABSTRACT

A wireless charging method includes obtaining charging information of a plurality of electronic devices, and charging the plurality of electronic devices in sequence according to the charging information of the plurality of electronic devices. For each electronic device, a charging resonance frequency is chosen and accordingly the corresponding wireless charging power is provided for charging.

18 Claims, 11 Drawing Sheets

(56) References Cited

U.S. PATENT DOCUMENTS

2014/0184147 A1* 7/2014 Uchida .................. H02J 5/005
                                                    320/107
2015/0194814 A1   7/2015 Taylor
2017/0104372 A1* 4/2017 Kadoyama .............. H02J 50/12

OTHER PUBLICATIONS

Office action dated Jul. 5, 2016 for TW application No. 104128618, filing date: Aug. 31, 2015, p. 1 line 6-14, pp. 2-5 and p. 6 line 1-10.

\* cited by examiner

WIRELESS CHARGING METHOD, WIRELESS CHARGING DEVICE, AND WIRELESS CHARGING SYSTEM

BACKGROUND OF THE INVENTION

1. Field of the Invention

The present invention relates to a wireless charging method, wireless charging device and wireless charging system, and more particularly, to a wireless charging method, wireless charging device and wireless charging system capable of adaptively adjusting resonance frequency to perform multiple charging.

2. Description of the Prior Art

With the advancement of technology, portable electronic devices have been widely used in daily life. For portability, a portable electronic device is equipped with a rechargeable battery, to provide power during operation of the portable electronic device. Once power of the rechargeable battery is exhausted, a user has to recharge the rechargeable battery.

On the other hand, wireless charging techniques may use magnetic resonance to transfer power or energy to the electronic device, and charge the battery of the electronic device. Therefore, the rechargeable battery of the electronic device can be charged without any cable or wire connection.

However, when being charged via the wireless charging, the electronic device must be placed on a charging plate for charging. If a plurality of electronic devices have to be charged, the plurality of electronic devices should be moved manually to the charging plate in sequence for charging, thus resulting in inconveniences to users. Therefore, the prior arts should be improved.

SUMMARY OF THE INVENTION

To solve the above mentioned problems, the present invention provides a wireless charging method, a wireless charging device and a wireless charging system, to adaptively charge electronic devices with different specifications, and achieve smart and multi-tasking charging process.

An embodiment of the present invention discloses a wireless charging method, comprising: obtaining charging information of a plurality of electronic devices, and charging the plurality of electronic devices in sequence according to the charging information of the plurality of electronic devices, wherein for each electronic device, a charging resonance frequency is chosen and accordingly the corresponding wireless charging power is provided for charging.

An embodiment of the present invention discloses a wireless charging system, comprising a plurality of electronic devices, and a wireless charging device, for obtaining charging information of the plurality of electronic devices and charging the plurality of electronic devices in sequence according to the charging information of the plurality of electronic devices, wherein for each electronic device, the wireless charging device provides the corresponding wireless charging power to charge the each electronic device according to a charging resonance frequency.

An embodiment of the present invention discloses a wireless charging device, comprising a communication unit, for obtaining charging information of a plurality of electronic devices, a power transmission unit, for generating and transmitting wireless charging power, and a control unit, for controlling the power transmission unit to generate and transmit the wireless charging power to the plurality of electronic devices in sequence according to the charging information of the plurality of electronic devices, wherein for each electronic device, the control unit controls the power transmission unit to provide the corresponding wireless charging power to charge the each electronic device according to a charging resonance frequency.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
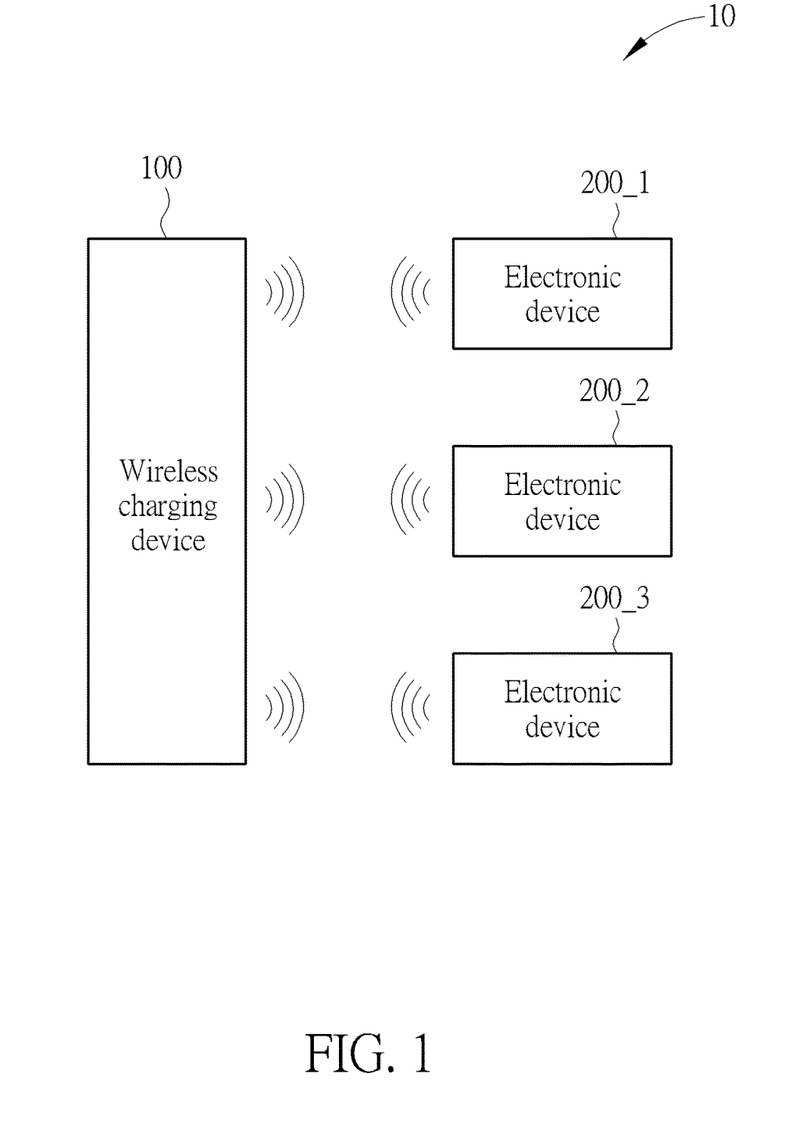
FIG. 1 is a schematic diagram of a wireless power system according to an embodiment of the present invention.

Please refer to FIG. 1. FIG. 1 is a schematic diagram of a wireless power system 10 according to an embodiment of the present invention. The wireless power system 10 includes a wireless charging device 100 and electronic devices 200_1-200_3. The wireless charging device 100 is utilized for providing wireless charging power to those electronic devices which need power and energy. The wireless charging device 100 may obtain charging information of the electronic devices 200_1-200_3, and charge the electronic devices in sequence according to the obtained charging information.

Figure 2:
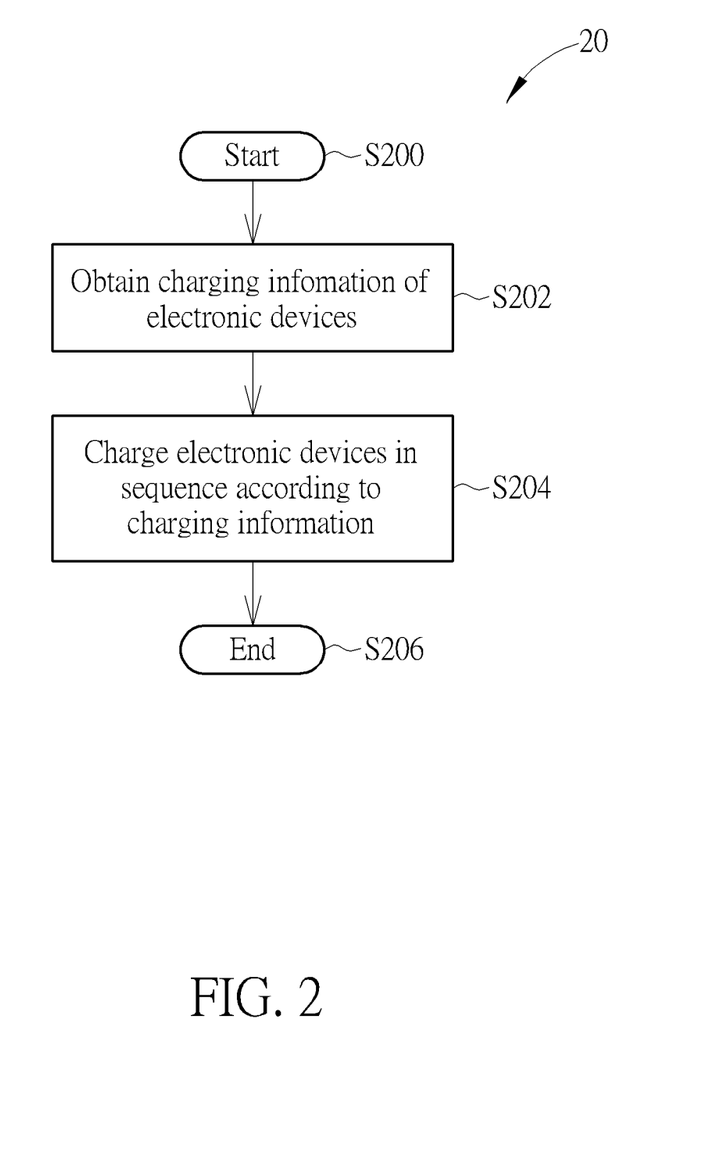
FIGS. 2, 4, 7 and 10 are schematic diagrams of charging procedures according to alternative embodiments of the present invention.

Further description associated with detailed operation of the wireless power system 10, please refer to FIG. 2. FIG. 2 is a schematic diagram of a procedure 20 according to an embodiment of the present invention. The procedure 20 includes the following steps:

Step S200: Start.
Step S202: Obtain charging information of electronic devices.
Step S204: Charge electronic devices in sequence according to charging information of electronic devices.
Step S206: End.

According to the procedure 20, in Step S202, the wireless charging device 100 may search the existences of the electronic devices 200_1-200_3, check whether the electronic devices 200_1-200_3 are placed within an effective charging range of the wireless charging device 100, and respectively obtain the charging information of the electronic devices 200_1-200_3. The charging information of each electronic device includes at least one of a resonance frequency, current strength of charging current, state of charge, full charging time, remaining battery capacity, and discharging voltage of the each electronic device, but this should not be a limitation of the invention. Any information relative to the electronic device may be included in the charging information. In an embodiment, each electronic device may actively transmit related charging information to the wireless charging device 100. In an embodiment, the wireless charging device 100 may transmit an information request to each electronic device and each electronic device returns related charging information to the wireless charging device 100 accordingly.

In Step S204, the wireless charging device 100 may charge the electronic devices in sequence according to the charging information of the electronic devices 200_1-200_3. The wireless charging device 100 may determine a charging sequence according to the charging information of the electronic devices 200_1-200_3, and charge the electronic devices 200_1-200_3 according to the charging sequence. For example, the wireless charging device 100 may determine the charging sequence according to the remaining battery capacity of the electronic devices 200_1-200_3. An electronic device having a lower remaining battery capacity may have a higher charging priority than an electronic device having a higher remaining battery capacity to be charged. For example, the wireless charging device 100 may determine the charging sequence according to the full charging time of the electronic devices 200_1-200_3. The faster the electronic device is fully charged, the higher charging priority of the charging sequence the electronic device has. In other words, the wireless charging device 100 may determine the charging sequence of the electronic devices according to the relative charging information obtained from the electronic devices 200_1-200_3.

On the other hand, the wireless charging device 100 may simultaneously charge one or more electronic devices. According to the determined charging sequence, one or more electronic devices are charged simultaneously for each charging operation period. For example, in an embodiment, according to the charging information of the electronic devices, the charging sequence may be determined as: the electronic device 200_1 and the electronic device 200_3→the electronic device 200_2. That is, in the first charging operation period of the charging sequence, the wireless charging device 100 simultaneously charges the electronic device 200_1 and the electronic device 200_3. In the second charging operation period of the charging sequence, the wireless charging device 100 charges the electronic device 200_2.

Therefore, when the electronic devices 200_1-200_3 are in the effective charging range of the wireless charging device 100, the wireless charging device 100 may provide the wireless charging power to charge the electronic devices 200_1-200_3 according to the determined charging sequence. Furthermore, in Step S204, the wireless charging device 100 may select a corresponding resonance frequency for each electronic device and inform each electronic device. Or, each electronic device may select a corresponding resonance frequency and inform the wireless charging device 100. Hence, during the sequential charging process, the wireless charging device 100 and the electronic devices being charged would adjust to operate at the same resonance frequency during charging, such that the wireless charging device 100 may provide the corresponding wireless charging power to the corresponding electronic devices and finish the charging process.

Figure 3:
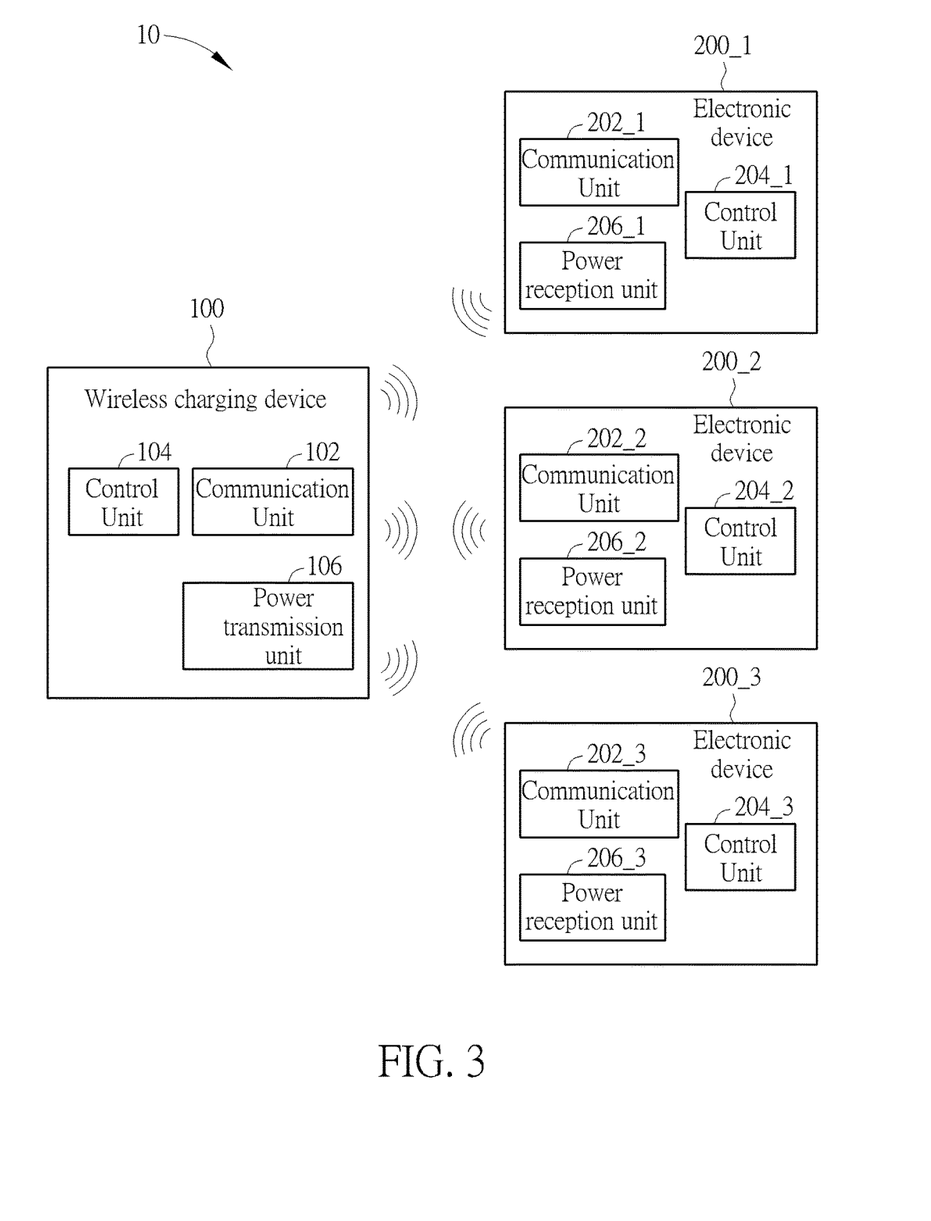
FIG. 3 is a schematic diagram of an alternative embodiment of the wireless power system shown in FIG. 1.

For example, please refer to FIG. 3. FIG. 3 is a schematic diagram of the wireless power system 10 shown in FIG. 1 according to another embodiment. The components of the wireless power system 10 shown in FIG. 3 with the same notations as those of the wireless power system 10 shown in FIG. 1 have similar operation methods and functions, and further detailed explanations are omitted here for brevity. As shown in FIG. 3, the wireless power system 10 includes a wireless charging device 100 and electronic devices 200_1-200_3. The wireless charging device 100 includes a communication unit 102, a control unit 104 and a power transmission unit 106. The electronic device 200_1 includes a communication unit 202_11, a control unit 204_1 and a power reception unit 206_1. The electronic device 200_2 includes a communication unit 202_2, a control unit 204_2 and a power reception unit 206_2. The electronic device 200_3 includes a communication unit 202_3, a control unit 204_3 and a power reception unit 206_3. The communication unit 102, the communication unit 202_1, the communication unit 202_2 and the communication unit 202_3 may communicate with each other for transmitting or receiving relative information.

In an embodiment, during the sequential charging process, for each electronic device, the current resonance frequency of the each electronic device is chosen and set as a charging resonance frequency, and the resonance frequency of the wireless charging device 100 may be adjusted to the chosen charging resonance frequency. That is, when the electronic device is ready for charging according to the charging sequence, the resonance frequency of the electronic device remains unchanged, and the resonance frequency of the wireless charging device 100 would be adjusted to the same resonance frequency as the electronic device. In more detail, please refer to FIG. 4. If the wireless charging device 100 would like to provide wireless charging power to the electronic devices 200_1-200_3. First, the wireless charging device 100 obtains the charging information and resonance frequencies of the electronic devices 200_1-200_3 respectively (Step S402). For example, the communication unit 102 obtains the charging information and the resonance frequencies of the electronic devices 200_1-200_3 respectively. The wireless charging device 100 determines a charging sequence according to the charging information of the electronic devices 200_1-200_3 (Step S404). For example, the control unit 104 determines the charging sequence according to the charging information, the charging sequence is: the electronic device 200_1→ the electronic device 200_2→ the electronic device 200_3. Therefore, the wireless charging device 100 may provide the wireless power to each electronic device in sequence according to the charging information.

Figure 4:
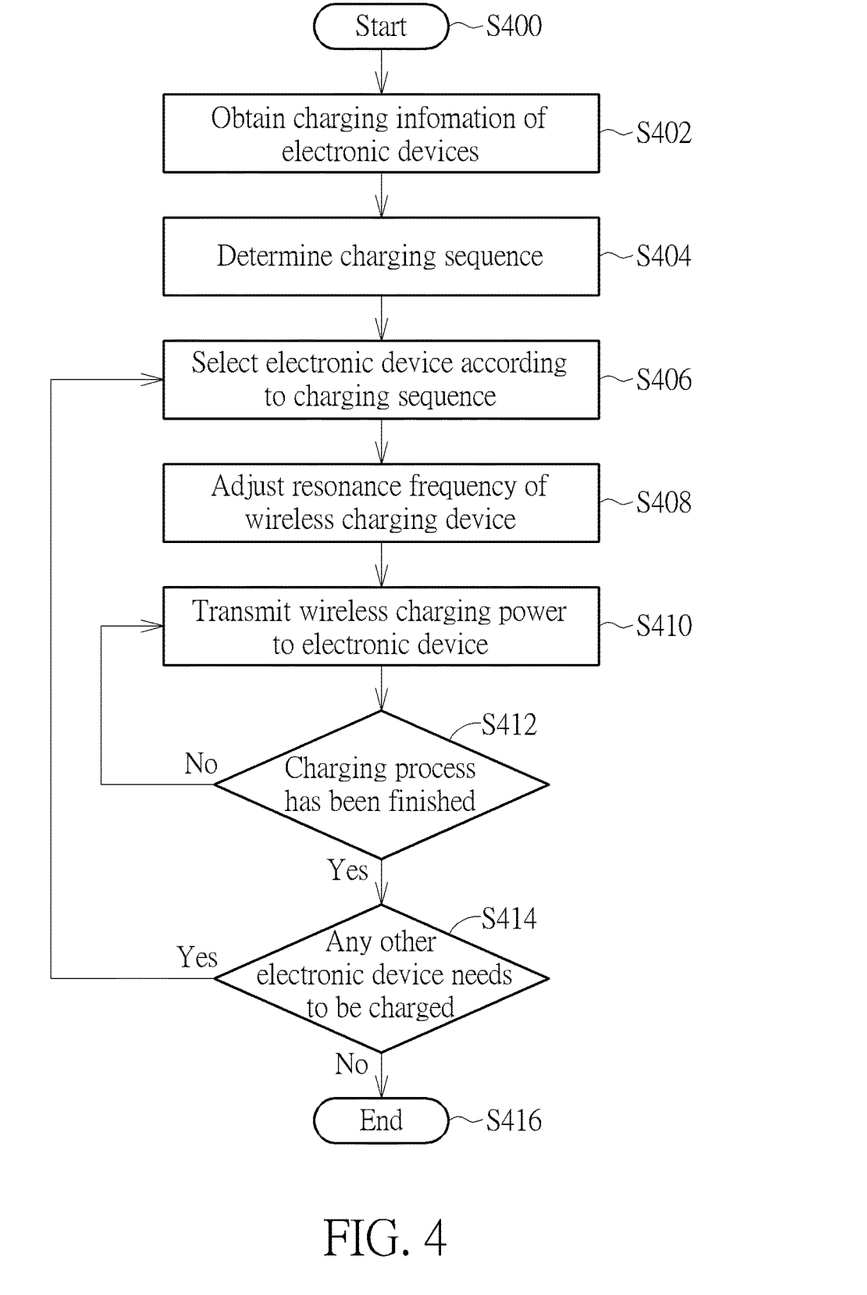

Moreover, the wireless charging device 100 may select the charging electronic device according to the charging sequence (Step S406). During the individual charging period of each selected electronic device, the wireless charging device 100 may adjust its resonance frequency according to the resonance frequency of the selected electronic device (Step S408). For example, according to the charging sequence, the control unit 104 of the wireless charging device 100 may select the electronic device 200_1 for charging first. In this situation, the current resonance frequency of the electronic device 200_1 remains unchanged, and the current resonance frequency of the electronic device 200_1 is chosen and set as the charging resonance frequency. The control unit 104 of wireless charging device 100 may control and adjust the resonance frequency of the power transmission unit 106, such that the resonance frequency of the power transmission unit 106 is adjusted to the charging resonance frequency, wherein the charging resonance frequency is equal to the current resonance frequency of the electronic device 200_1. Then, the power transmission unit 106 of the wireless charging device 100 operates at the chosen charging resonance frequency to produce and transmit the corresponding wireless charging power to the electronic device 200_1. Meanwhile, the power reception unit 206_1 of the electronic device 200_1 operates at the same charging resonance frequency to receive the wireless charging power from the power transmission unit 106 (Step S410). Similarly, when charging the electronic device 200_2, the current resonance frequency of the electronic device 200_2 remains unchanged, and the current resonance frequency of the electronic device 200_2 is chosen and set as a charging resonance frequency. The control unit 104 of the wireless charging device 100 may control and adjust the resonance frequency of the power transmission unit 106, such that the resonance frequency of the power transmission unit 106 is adjusted to the charging resonance frequency, wherein the charging resonance frequency is equal to the resonance frequency of the electronic device 200_2. When charging the electronic device 200_3, the current resonance frequency of the electronic device 200_3 remains unchanged, and the current resonance frequency of the electronic device 200_3 is chosen and set as the charging resonance frequency. The control unit 104 of the wireless charging device 100 may control and adjust the resonance frequency of the power transmission unit 106, such that the resonance frequency of the power transmission unit 106 is adjusted to the charging resonance frequency, wherein the charging resonance frequency is equal to the current resonance frequency of the electronic device 200_3.

When the power reception unit 206_1 receives the wireless charging power from the wireless charging device 100, the received wireless charging power may be used to charge a battery of the electronic device 200_1 or operate each component of the electronic device 200_1. Similarly, the electronic device 200_2 and the electronic device 200_3 perform similar operations when charging. Furthermore, the control unit 204_1 may check whether the charging process has been finished or not (Step S412). For example, the control unit 204_1 may monitor whether the battery of the electronic device 200_1 is full-charged or not, or determine whether related operations of the electronic device 200_1 have been finished or not. When the control unit 204_1 determined that the charging process of the electronic device has been completed, the wireless charging device 100 may determine whether there are any other electronic devices which need to be charged according to the charging sequence (Step S414). If the determination result of Step S414 indicates that there is another electronic device which needs to be charged according to the charging sequence, the procedure proceeds to Step S406. The wireless charging device 100 may select the next awaiting electronic device which needs to be charged according to the charging sequence. In other words, when the electronic device 200_1 has been charged, the wireless charging device 100 stops providing power to the electronic device 200_1, checks the next awaiting charging electronic device and adjusts the corresponding resonance frequency. If the determination result of Step S414 indicates that no other electronic devices which need to be charged according to the charging sequence, the procedure proceeds to Step S416. This means the wireless charging device 100 has finished multi-tasking charging process for multiple electronic devices. In brief, when multiple electronic devices are in the effective charging range of wireless charging device, the wireless charging device 100 may charge each electronic device in sequence, and adaptively adjusts its resonance frequency according to the resonance frequency of the electronic devices, thus realizing the goal of smart and multi-tasking charging. Therefore, once users put multiple electronic devices in the effective charging range of wireless charging device, the wireless charging device can perform the charging processes in sequence without manual placement of the electronic devices.

Figure 5:
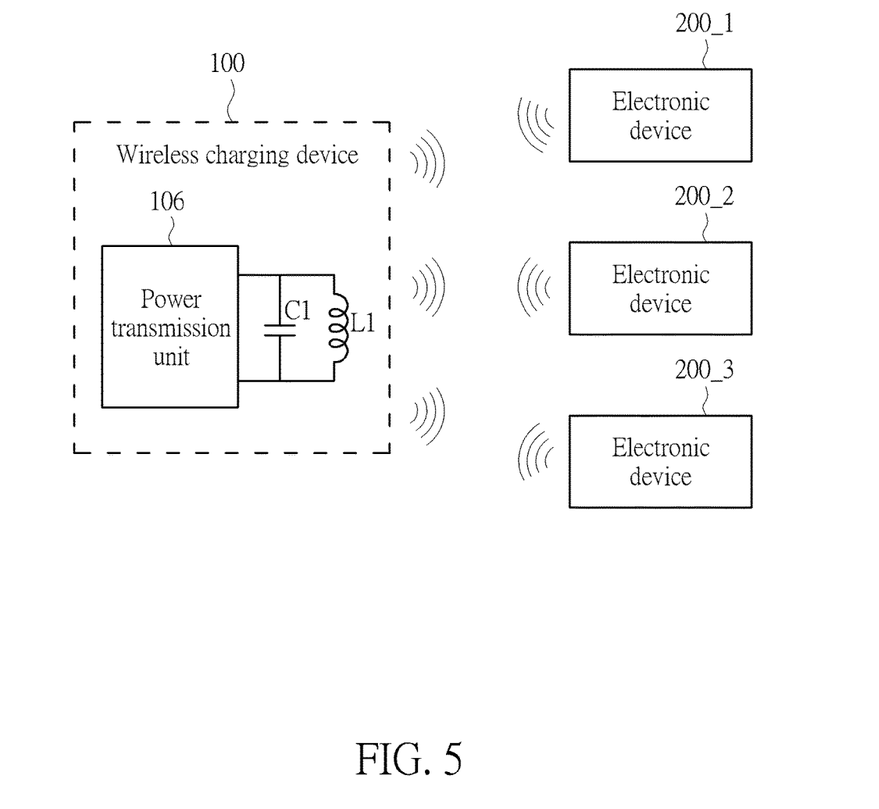
FIG. 5 and FIG. 6 are schematic diagrams of the power transmission unit shown in FIG. 3.
Figure 6:
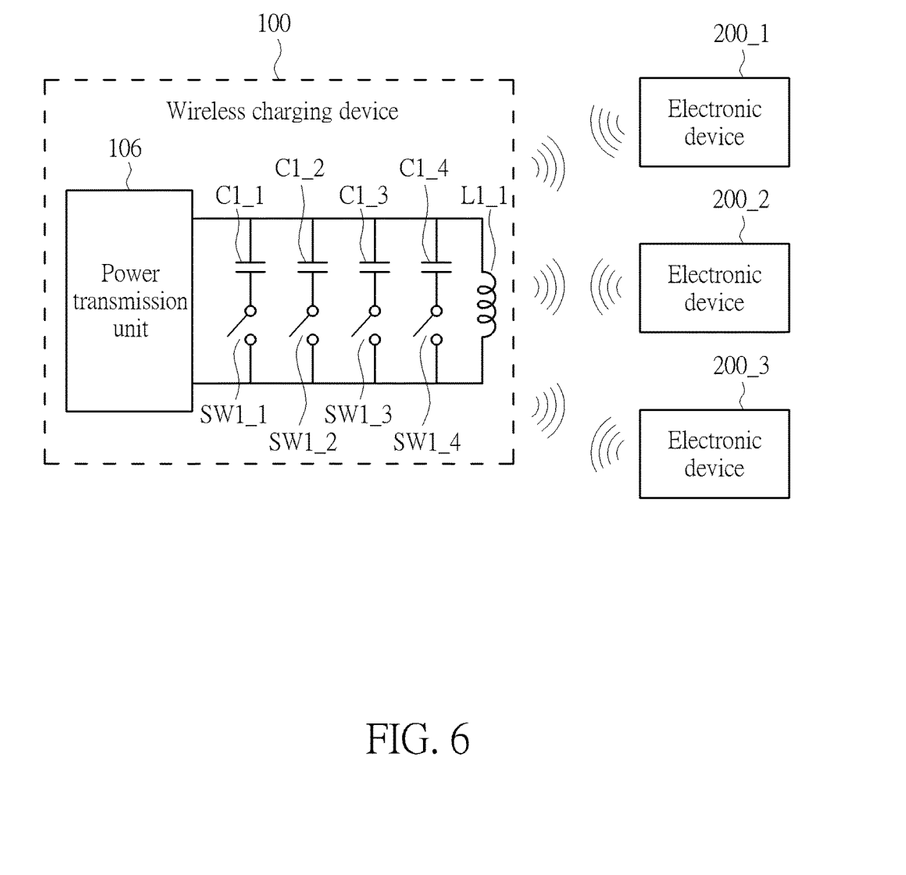

Regarding the adjustment operation of the resonance frequency of the wireless charging device 100 in Step S408, please refer to FIG. 5 and FIG. 6. As shown in FIG. 5, the power transmission unit 106 of the wireless charging device 100 includes a capacitor C1 and an inductor L1. The resonance frequency of the power transmission unit 106 can be adjusted by changing the impedance of the capacitor C1 and/or the inductor L1, so that the resonance frequency of the wireless charging device 100 is adjusted to the chosen charging resonance frequency accordingly. As shown in FIG. 6, the power transmission unit 106 of the wireless charging device 100 includes capacitors C1_1-C1_4, an inductor L1_1 and switches SW1_1-SW1_4. Therefore, by controlling the on/off of the switches SW1_1-SW1_4 to change the impedance and adjusting the resonance frequency of the power transmission unit 106, the resonance frequency of the wireless charging device 100 can be adjusted to the chosen charging resonance frequency. Similarly, the impedance of the inductor circuit may also be adjusted by controlling on/off of the switches.

In an embodiment, during the sequential charging process, for each electronic device, the current resonance frequency of the wireless charging device 100 may be chosen and set as a charging resonance frequency, and the resonance frequency of the each electronic device may be adjusted to the chosen resonance frequency. In other words, when the electronic device is ready for charging, the resonance frequency of the wireless charging device 100 remains unchanged, and the resonance frequency of the electronic device may be adjusted to the same resonance frequency as the wireless charging device 100. In detail, please refer to FIG. 7, if the wireless charging device 100 would like to provide wireless charging power to the electronic devices 200_1-200_3. First, the wireless charging device 100 obtains the charging information of the electronic devices 200_1-200_3 (Step S702). For example, the communication unit 102 obtains the charging information of the electronic devices 200_1-200_3 individually. The control unit 104 of the wireless charging device 100 determines a charging sequence according to the charging information of the electronic devices 200_1-200_3 (Step S704). For example, the charging sequence is: the electronic device 200_1, the electronic device 200_2, the electronic device 200_3.

Figure 7:
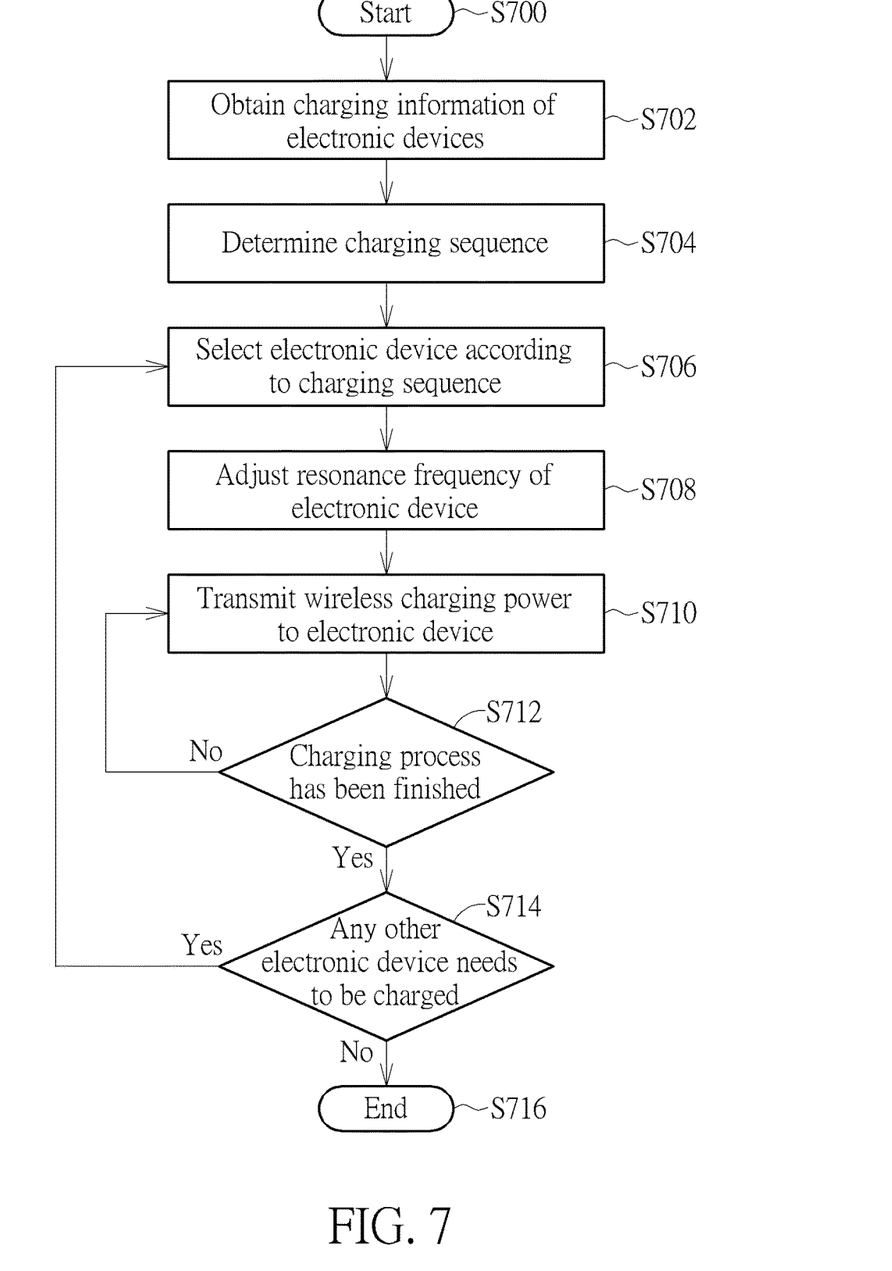

More particularly, the wireless charging device 100 may select the awaiting charging electronic device according to the charging sequence and inform each electronic device about the information relative to the current resonance frequency of the wireless charging device 100 (Step S706). During the individual charging period of each selected electronic device, the resonance frequency of the selected electronic device would be adjusted to the same resonance frequency as the wireless charging device 100 (Step S708). For example, the control unit 104 of the wireless charging device 100 selects and charges the electronic device 200_1 according to the charging sequence. In this situation, in the charging process of the electronic device 200_1, the resonance frequency of the electronic device 200_1 would be adjusted to the charging resonance frequency. For example, the control unit 204_1 of the electronic device 200_1 may control and adjust the resonance frequency of the power reception unit 206_1, such that the resonance frequency of the power reception unit 206_1 is adjusted to the charging resonance frequency, which the charging resonance frequency is equal to the current resonance frequency of the wireless charging device 100. Then, the power transmission unit 106 of the wireless charging device 100 operates at the chosen charging resonance frequency to produce and transmit corresponding wireless charging power to the electronic device 200_1. Meanwhile, the power reception unit 206_1 of the electronic device 200_1 operates at the same charging resonance frequency to receive the wireless charging power from the power transmission unit 106 (Step S710). Similarly, when charging the electronic device 200_2 and 202_3, the resonance frequency of the electronic device 200_2 is adjusted to the same resonance frequency as the wireless charging device 10. The resonance frequency of the electronic device 200_2 and 200_3 would be adjusted to the same resonance frequency as the wireless charging device 100 respectively.

When the power reception unit 206_1 receives the wireless charging power from the wireless charging device 100, the received wireless charging power may be used to charge a battery of the electronic device 200_1 or operate each component of the electronic device 200_1. Similarly, the electronic device 200_2 and the electronic device 200_3 perform similar operation when charging. Furthermore, the control unit 204_1 may determine whether the charging process has been finished or not (Step S712). When the control unit 204_1 determined that the charging process has been finished, the wireless charging device 100 may determine whether there are any other electronic devices which need to be charged according to the charging sequence (Step S714). If the determination result of Step S714 indicates that there is another electronic device which needs to be charged according to the charging sequence, the procedure proceeds to the Step S706, the wireless charging device 100 may select the next awaiting electronic device according to the charging sequence. If the determination result of Step S714 indicates that no other electronic devices which need to be charged according to the charging sequence, the procedure, the procedure proceeds to S716. This means the wireless charging device 100 has finished multi-tasking charging process for multiple electronic devices. In other words, the wireless charging device 100 may charge each electronic device in sequence, and each electronic device may adjust its resonance frequency during charging according to the resonance frequency of the wireless charging device 100, thus realizing the goal of intellectual and multi-tasking charging.

Figure 8:
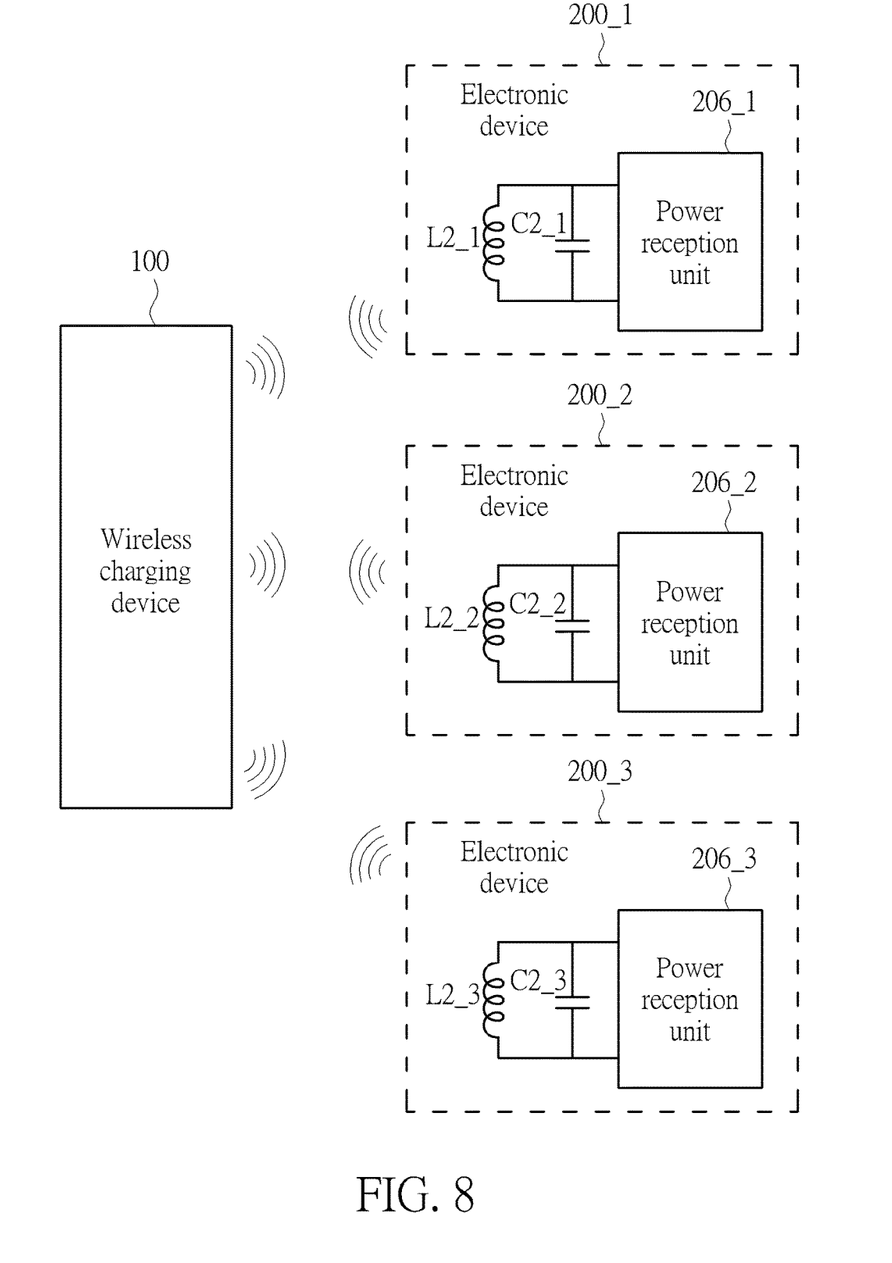
FIGS. 8, 9 and 11 are schematic diagrams of the power reception unit shown in FIG. 3.
Figure 9:
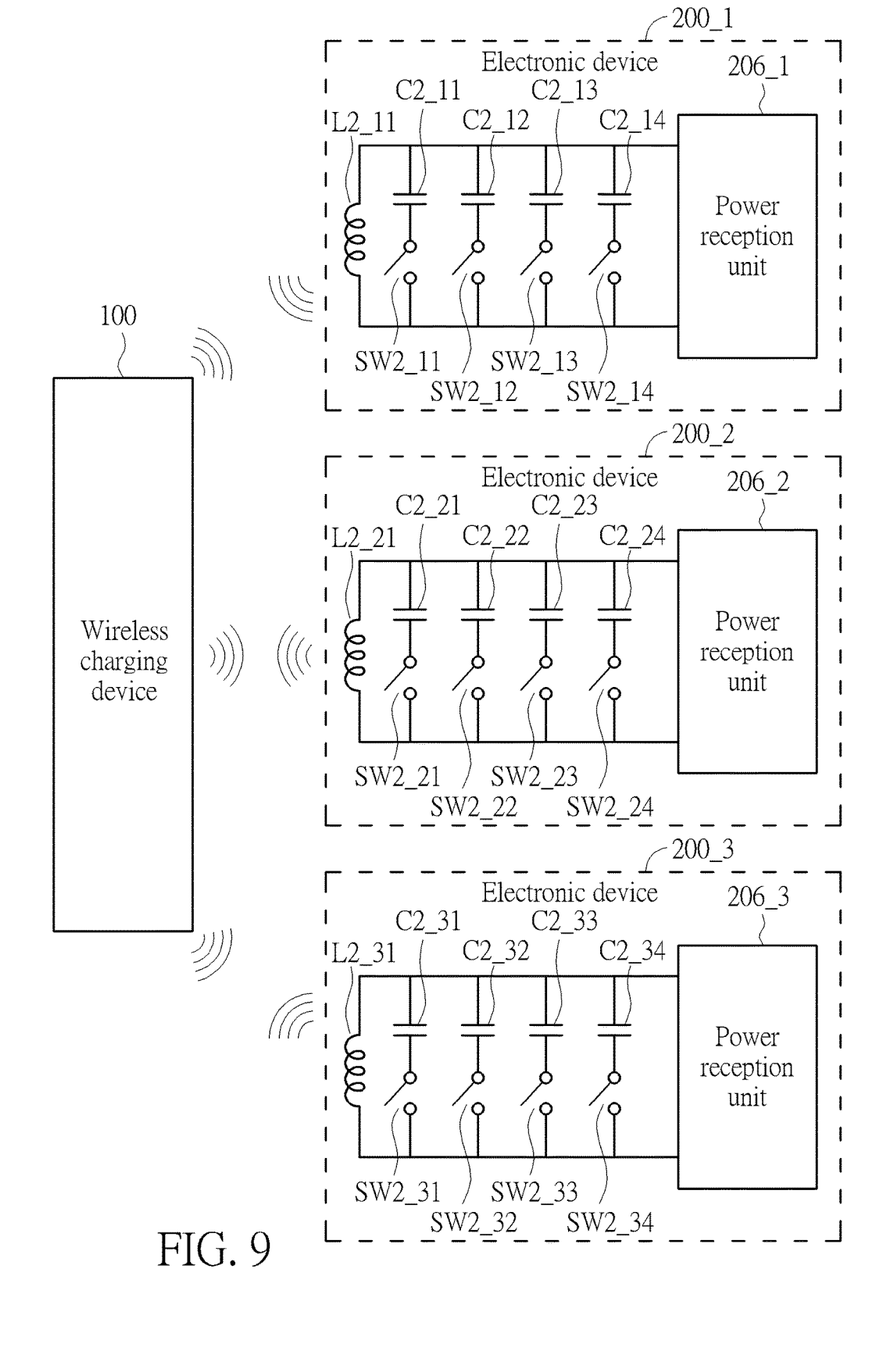

Regarding the adjustment operation of the resonance frequency of the electronic device in Step 708, please refer to FIG. 8 and FIG. 9. As shown in FIG. 8, the power reception unit 206_1 of the electronic device includes a capacitor C2_1 and an inductor L2_1. By changing the impedance of the capacitor C2_1 and/or the inductor L2_1 to adjust the resonance frequency of the electronic device 200_1, the resonance frequency of the electronic device 200_1 is adjusted to the chosen charging resonance frequency. The power reception unit 206_2 of the electronic device 200_2 includes a capacitor C2_2 and an inductor L2_2. Similarly, by changing the impedance of capacitor C2_2 and/or the inductor L2_2 to adjust the resonance frequency of the electronic device 200_2, the resonance frequency of the electronic device 200_2 is adjusted to the chosen charging resonance frequency. The power reception unit 206_3 of the electronic device 200_3 includes a capacitor C2_3 and an inductor L2_3. By changing the impedance of the capacitor C2_3 and/or the inductor L2_3 to adjust the resonance frequency of the electronic device 200_3, the resonance frequency of the electronic device 200_3 is adjusted to the chosen charging resonance frequency.

As shown in FIG. 9, the power reception unit 206_1 of the electronic device 200_1 includes capacitors C2_11-C2_14, an inductor L2_11 and switches SW2_11-SW2_14. Therefore, the resonance frequency of the electronic device 200_1 is adjusted to the chosen charging resonance frequency by controlling the on/off of the switches SW2_11-SW2_14 to change the impedance and adjust the resonance frequency of the power transmission unit 206_1. The power reception unit 206_2 of the electronic device 200_2 includes capacitors C2_21-C2_24, an inductor L2_21 and switches SW2_21-SW2_24. Similarly, by controlling the on/off of the switches SW2_21-SW2_24 to change the impedance and adjust the resonance frequency of the power reception unit 206_2, the resonance frequency of the power reception unit 200_2 is adjusted to the chosen charging resonance frequency. The power reception unit 206_3 of the electronic device 200_3 includes capacitors C2_31-C2_34, an inductor L2_31 and switches SW2_31-SW2_34. By controlling the on/off of the switches SW2_31-SW2_34 to change the impedance and adjust the resonance frequency of the power reception unit 206_3, the resonance frequency of the electronic device 200_3 is adjusted to the chosen charging resonance frequency.

In an embodiment, during the sequential charging process, for each electronic device, a charging resonance frequency may be chosen and in the sequential charging process, the resonance frequency of the each electronic device and the wireless charging device 100 would be adjusted to the chosen charging resonance frequency. In other words, during the charging operation period of each electronic device, the resonance frequency of the electronic device and the wireless charging device 100 are both adjusted to the chosen charging resonance frequency. Please refer to FIG. 10. In detail, if the wireless charging device 100 would like to provide the wireless charging power to the electronic devices 200_1-200_3. First, the wireless charging device 100 obtains the charging information of the electronic devices 200_1-200_3 and selects a charging resonance frequency (Step S1002). The wireless charging device 100 determines a charging sequence according to the charging information of the electronic devices 200_1-200_3 (Step S1004).

Figure 10:
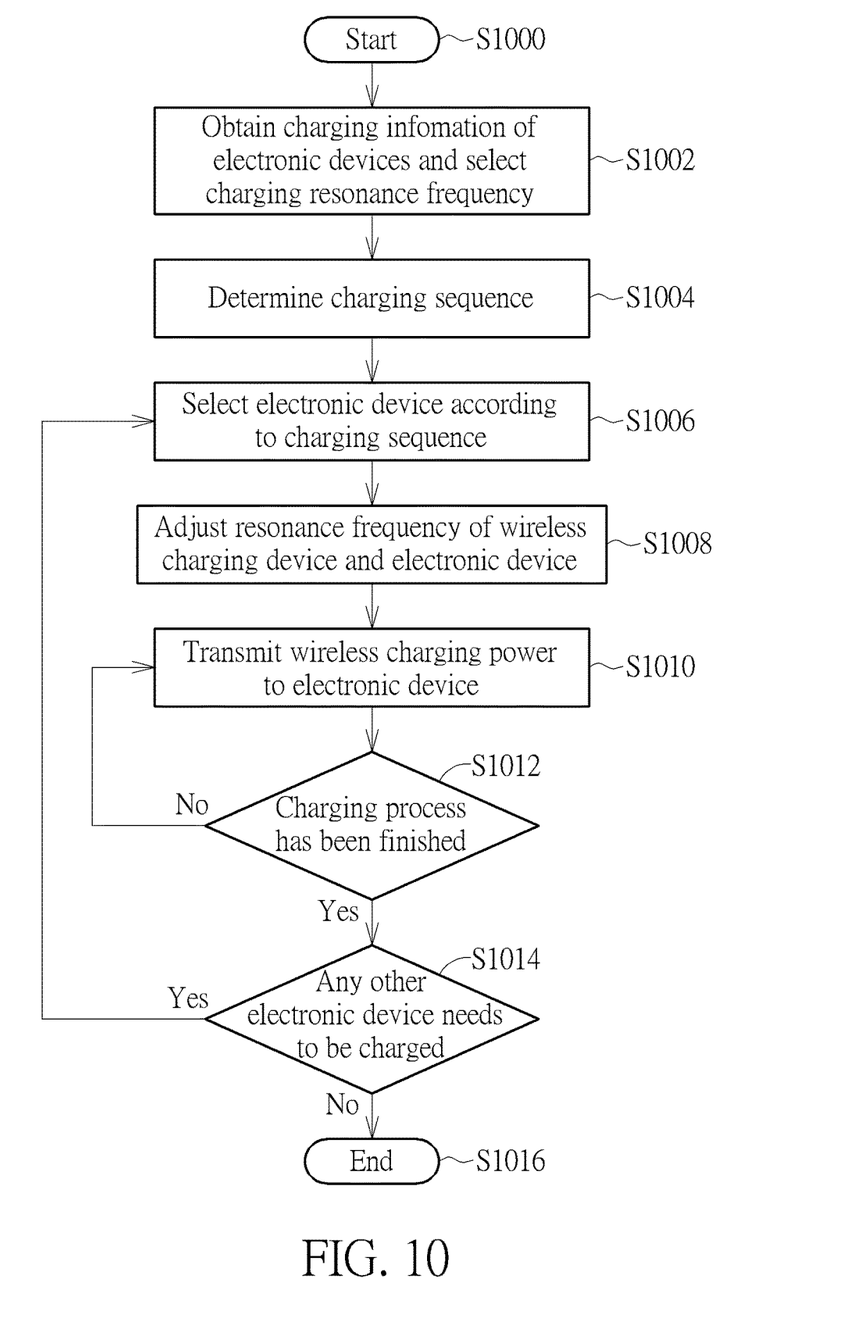

The wireless charging device 100 may select awaiting electronic device according to the charging sequence (Step S1006). During the individual charging period of each selected electronic device, the resonance frequency of the wireless charging device 100 and the electronic device are adjusted to the chosen charging resonance frequency (Step S1008). For example, according to the charging sequence, the control unit 104 of the wireless charging device 100 first charges the electronic device 2001. During the charging period of the electronic device 200_1, the control unit 104 of the wireless charging device 100 may control and adjust the resonance frequency of the power transmission unit 106, such that the resonance frequency of the power transmission unit 106 is adjusted to the chosen charging resonance frequency. Meanwhile, the control unit 204_1 of the electronic device 200_1 may control and adjust the resonance frequency of the power reception unit 206_1, such that the resonance frequency of the power reception unit 206_1 is adjusted to the chosen charging resonance frequency.

Then, the power transmission unit 106 of the wireless charging device 100 would operate at the chosen charging resonance frequency to produce and transmit the corresponding wireless charging power to the electronic device 200_1. Meanwhile, the power reception unit 206_1 of the electronic device 200_1 would also operate at the identical charging resonance frequency to receive the wireless charging power from the power transmission unit 106 (Step S1010). Similarly, when charging the electronic device 200_2, the resonance frequency of the wireless charging device 100 and the electronic device 200_2 are adjusted to the chosen charging resonance frequency to execute the transmission of the wireless charging power. When charging the electronic device 200_3, the resonance frequency of the wireless charging device 100 and the electronic device 200_3 are adjusted to the chosen charging resonance frequency to transfer the wireless charging power.

When the power reception unit 206_1 receives the wireless charging power from the wireless charging device 100, the received wireless charging power may be used to charge a battery or operate each component of the electronic device 200_1. Therefore, the electronic device 200_2 and the electronic device 200_3 perform similar operation when charging. Furthermore, the control unit 204_1 can determine whether the charging process has been finished or not (Step S1012). When control unit 204_1 determines that the charging process has been finished, the wireless charging device 100 can determine whether there are any other awaiting charging electronic devices (Step S1014). If the determination result of Step S1014 indicates that there is another electronic device which needs to be charged according to the charging sequence, the procedure, the procedure proceeds to Step S1006, the wireless charging device 100 may select the next awaiting electronic device to charge according to the charging sequence. If the determination result of Step S1014 indicates that no other electronic devices which need to be charged according to the charging sequence, the procedure proceeds to Step S1016. This means the wireless charging device 100 has finished the multi-tasking charging process of multiple electronic devices. In other words, the wireless charging device may charge the each electronic device sequentially, the wireless charging device and the electronic device may adaptively adjust its resonance frequency according to the chosen resonance frequency of the electronic devices, thus realizing the goal of smart and multi-tasking charging.

Regarding the adjustment operation of the resonance frequency of the wireless charging device 100 and the electronic devices 200_1-200_3 in Step S1008 are shown in FIG. 5 and FIG. 8. The wireless charging device 100 and the electronic devices 200_1-200_3 may adjust the circuit impedance by changing the impedance of the capacitor and/or inductor to adjust the resonance frequency of the power transmission unit 106 and the power reception units 206_1-206_3, such that the resonance frequency of the wireless charging device 100 and the electronic devices 200_1-200_3 are adjusted to the chosen charging resonance frequency. Similarly, as shown in FIG. 6 and FIG. 9, by controlling the on/off of the switches to change the impedance to adjust the resonance frequency of the power transmission unit 106 and the electronic devices 200_1-200_3, such that the resonance frequency of the wireless charging device 100 and the electronic devices 200_1-200_3 are adjusted to the charging resonance frequency.

Figure 11:
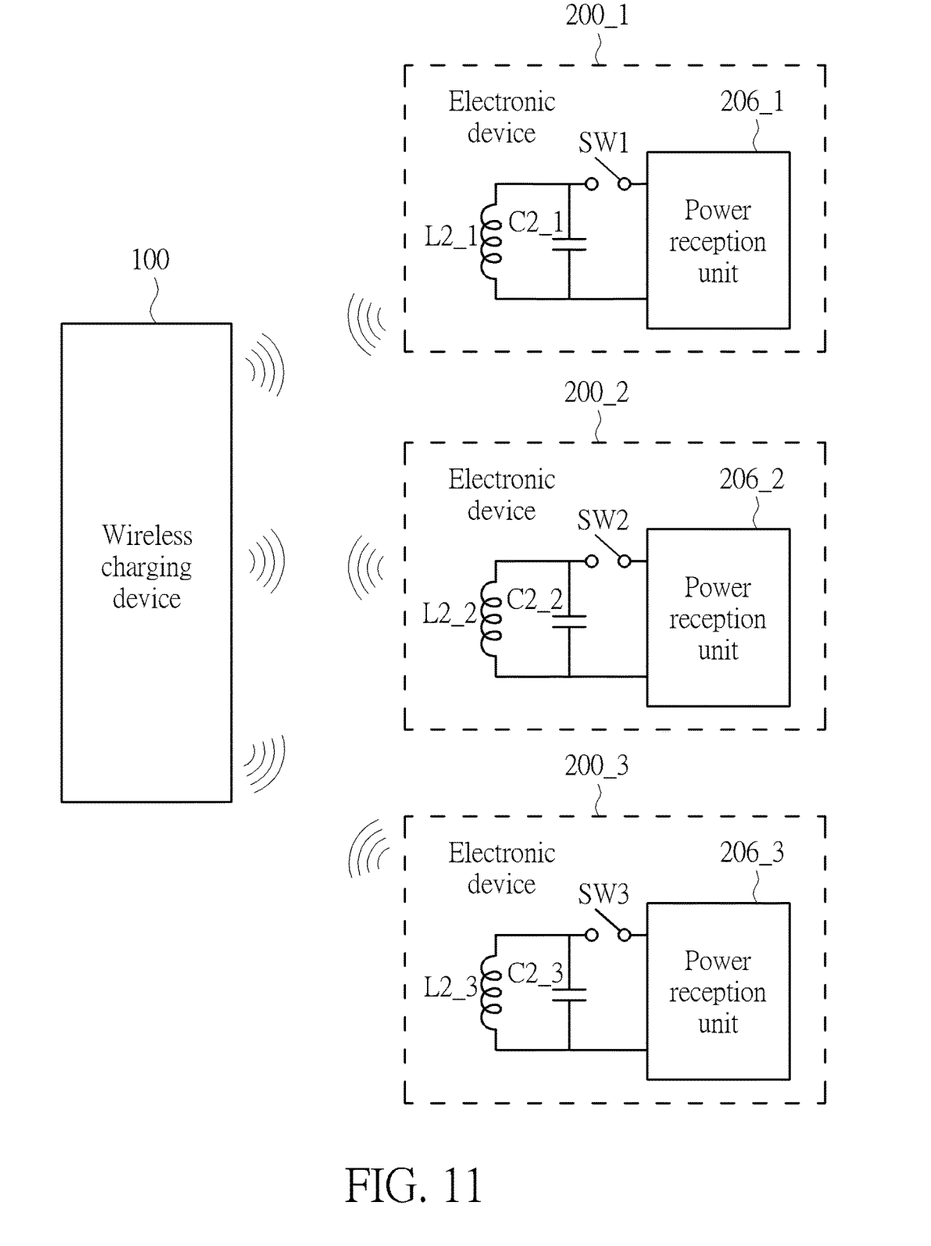

On the other hand, in the Step S204, the wireless charging device 100 may charge the electronic devices 200_1-200_3 according to the charging sequence. Meanwhile, the electronic devices 200_1-200_3 may control the conducting of circuit to receive the wireless charging power by turning on/off the switches. For example, please refer to FIG. 11. FIG. 11 is a schematic diagram of the wireless power system 10 according to another embodiment shown in FIG. 8. As shown in FIG. 11, the power reception unit 206_1 of the electronic device 200_1 includes a switch SW1, a capacitor C2_1 and an inductor L2_1. The power reception unit 206_2 of the electronic device 200_2 includes a switch SW_2, a capacitor C2_2 and an inductor L2_2. The power reception unit 206_3 of the electronic device 200_3 includes a switch SW_3, a capacitor C2_3 and an inductor L2_3. When the wireless charging device 100 charges the electronic device 200_1 according to the charging sequence, the control unit 204_1 controls the switch SW1 into conducting state and operates the power reception unit 206_1 properly. When the control unit 204_2 controls the switch SW2 into broken-circuit state, the power reception unit 206_2 stops operation. When the control unit 204_3 controls the switch SW3 into broken-circuit state, the power reception unit 206_3 stops operation, and so on. In brief, when the wireless charging device 100 provides the wireless charging power to each electronic device according to the charging sequence, the electronic devices 200_1-200_3 may control the conducting of circuit to receive the wireless charging power by turning on/off the switches SW1-SW3.

As described in the above embodiment, the wireless charging device may communicate with the electronic device via wireless links or wired links. For example, the wireless charging device 100 may utilize the wireless transmission technologies such as the Bluetooth, Wi-Fi, infra-red ray or Radio Frequency Identification (RFID) to communicate with the electronic devices, but not limited thereto. The electronic devices 200_1-200_3 may be smart mobile devices, pads, wearable devices, laptops, cameras and so on, but not limited thereto.

In summary, the wireless charging device of the present invention may charge the electronic device sequentially, and the resonance frequency of the wireless charging device and the each electronic device may be adaptively adjusted its resonance frequency according to the chosen charging resonance frequency. Therefore, the wireless charging device of the present invention can charge different specifications of electronic products to realize smart and multi-tasking charging process, improve the overall charging efficiency and reduce the time of charging duration.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A wireless charging method, comprising:
   obtaining charging information of a plurality of electronic devices;
   determining a charging sequence according to the charging information of the plurality of electronic devices; and
   charging the plurality of electronic devices in sequence according to the charging sequence without simultaneously charging the plurality of electronic devices;
   wherein for each electronic device, a charging resonance frequency is chosen and accordingly the corresponding wireless charging power is provided for charging.

2. The method of claim 1, wherein when charging each electronic device, a wireless charging device operates at the charging resonance frequency to generate and transmit the corresponding wireless charging power, and the each electronic device operates at the charging resonance frequency to receive the corresponding wireless charging power.

3. The method of claim 1, wherein for each electronic device, the resonance frequency of the each electronic device is set as the charging resonance frequency, and the resonance frequency of a wireless charging device is adjusted to the charging resonance frequency, wherein when charging each electronic device, a wireless charging device operates at the charging resonance frequency to generate and transmit the corresponding wireless charging power, and the each electronic device operates at the charging resonance frequency to receive the corresponding wireless charging power.

4. The method of claim 1, wherein for each electronic device, the resonance frequency of a wireless charging device is set as the charging resonance frequency, and the resonance frequency of the each electronic device is adjusted to the charging resonance frequency, wherein when charging each electronic device, a wireless charging device operates at the charging resonance frequency to generate and transmit the corresponding wireless charging power, and the each electronic device operates at the charging resonance frequency to receive the corresponding wireless charging power.

5. The method of claim 1, further comprising:
utilizing a plurality of switches to control the plurality of the electronic devices to receive the corresponding wireless charging power in sequence according to the charging sequence.

6. The method of claim 1, wherein the charging information of each electronic device comprises at least one of a resonance frequency, current strength of charging current, state of charge, full charging time, remaining battery capacity, and discharging voltage of the each electronic device.

7. A wireless charging system, comprising:
a plurality of electronic devices; and
a wireless charging device, for obtaining charging information of the plurality of electronic devices, determining a charging sequence according to the charging information and charging the plurality of electronic devices in sequence according to the charging sequence without simultaneously charging the plurality of electronic devices;
wherein for each electronic device, the wireless charging device provides the corresponding wireless charging power to charge the each electronic device according to a charging resonance frequency.

8. The wireless charging system of claim 7, wherein for each electronic device, the resonance frequency of the each electronic device is set as the charging resonance frequency, and the resonance frequency of the wireless charging device is adjusted to the charging resonance frequency, wherein when charging each electronic device, the wireless charging device operates at the charging resonance frequency to generate and transmit the corresponding wireless charging power, and the each electronic device operates at the charging resonance frequency to receive the corresponding wireless charging power.

9. The wireless charging system of claim 7, wherein for each electronic device, the resonance frequency of the wireless charging device is set as the charging resonance frequency, and the resonance frequency of the each electronic device is adjusted to the charging resonance frequency, wherein when charging each electronic device, the wireless charging device operates at the charging resonance frequency to generate and transmit the corresponding wireless charging power, and the each electronic device operates at the charging resonance frequency to receive the corresponding wireless charging power.

10. The wireless charging system of claim 7, wherein when charging each electronic device, the wireless charging device operates at the charging resonance frequency to generate and transmit the corresponding wireless charging power, and the each electronic device operates at the charging resonance frequency to receive the corresponding wireless charging power.

11. The wireless charging system of claim 7, further comprising:
a plurality of switches, for controlling the plurality of the electronic devices to receive the corresponding wireless charging power in sequence.

12. The wireless charging system of claim 7, wherein the charging information of each electronic device contains at least one of a resonance frequency, current strength of charging current, state of charge, full charging time, remaining battery capacity, and a discharging voltage of the each electronic device.

13. A wireless charging device, comprising:
a communication unit, for obtaining charging information of a plurality of electronic devices;
a power transmission unit, for generating and transmitting wireless charging power; and
a control unit, for determining a charging sequence according to the charging information of the plurality of electronic devices, controlling the power transmission unit to generate and transmit the wireless charging power to the plurality of electronic devices in sequence according to the charging sequence without simultaneously charging the plurality of electronic devices;
wherein for each electronic device, the control unit controls the power transmission unit to provide the corresponding wireless charging power to charge the each electronic device according to a charging resonance frequency.

14. The wireless charging device of claim 13, for each electronic device, the resonance frequency of the each electronic device is set as the charging resonance frequency, and the resonance frequency of the wireless charging device is adjusted to the charging resonance frequency, wherein when charging each electronic device, the power transmission unit operates at the charging resonance frequency to generate and transmit the corresponding wireless charging power, and the each electronic device operates at the charging resonance frequency to receive the corresponding wireless charging power.

15. The wireless charging device of claim 13, wherein for each electronic device, the resonance frequency of the wireless charging device is set as the charging resonance frequency, and the resonance frequency of the each electronic device is adjusted to the charging resonance frequency, wherein when charging each electronic device, the power transmission unit operates at the charging resonance frequency to generate and transmit the corresponding wireless charging power, and the each electronic device operates at the charging resonance frequency to receive the corresponding wireless charging power.

16. The wireless charging device of claim 13, wherein for each electronic device, the resonance frequency of the wireless charging device and the each electronic device are adjusted to the charging resonance frequency, wherein when charging each electronic device, the power transmission unit operates at the charging resonance frequency to generate and transmit the corresponding wireless charging power, and the each electronic device operates at the charging resonance frequency to receive the corresponding wireless charging power.

17. The wireless charging device of claim 13, wherein when charging each electronic device, the power transmission unit operates at the charging resonance frequency to generate and transmit the corresponding wireless charging power, and the each electronic device operates at the charging resonance frequency to receive the corresponding wireless charging power.

18. The wireless charging device of claim 13, wherein the charging information of each electronic device contains at least one of a resonance frequency, current strength of charging current, state of charge, full charging time, remaining battery capacity, and a discharging voltage of the each electronic device.

* * * * *